United States Patent [19]
Chennakeshu et al.

[11] Patent Number: 6,134,286
[45] Date of Patent: Oct. 17, 2000

[54] SYNCHRONIZATION TECHNIQUES AND SYSTEMS FOR RADIOCOMMUNICATION

[75] Inventors: Sandeep Chennakeshu; Karl Molnar, both of Cary, N.C.

[73] Assignee: Ericsson Inc., Research Triangle Park, N.C.

[21] Appl. No.: 08/950,134

[22] Filed: Oct. 14, 1997

[51] Int. Cl.[7] ................................................. H04L 7/00
[52] U.S. Cl. .................... 375/365; 370/509; 370/510; 370/549
[58] Field of Search ................................ 375/324, 325, 375/326, 340, 343, 345, 362, 365, 375; 327/237; 329/307, 306; 370/346, 509, 514, 544, 510; 455/164.1, 164.2, 182.1–2

[56] References Cited

U.S. PATENT DOCUMENTS

| | | | |
|---|---|---|---|
| 5,151,926 | 9/1992 | Chennakeshu et al. | 374/84 |
| 5,272,446 | 12/1993 | Chalmers et al. | 329/304 |
| 5,412,695 | 5/1995 | Murata | 375/344 |
| 5,440,265 | 8/1995 | Cochran et al. | 329/300 |
| 5,640,431 | 6/1997 | Bruckert et al. | 375/344 |
| 5,732,339 | 3/1998 | Auvray et al. | 455/192.2 |
| 5,748,682 | 5/1998 | Mobin | 375/344 |
| 5,802,117 | 9/1998 | Ghosh | 375/344 |
| 5,960,044 | 9/1999 | Montreuil | 375/322 |
| 5,974,087 | 10/1999 | Nowara | 375/226 |

FOREIGN PATENT DOCUMENTS

| | | |
|---|---|---|
| 526833 | 2/1993 | European Pat. Off. . |
| WO85/04999 | 11/1985 | WIPO . |
| WO93/11605 | 6/1993 | WIPO . |

OTHER PUBLICATIONS

F. Classen et al, "An All Feedforward Synchronization Unit for Digital Radio", Proceedings of the 1993 IEEE 43th Vehicular Technology Conference, vol. 1 of 3, May 18–20, 1993, pp. 738–741.

J. Ahmad et al., "DSP Based Carrier Recovery Technique for OQPSK Mobile Satellite Communications", *Signal Processing VI: Theories and Applications*, pp. 1677–1680 (1992).

J. Ahmad et al., "DSP Implementation of a Prembleless All–Digital OQPSK Demodulator for Maritime and Mobile Data Communications" (*IEEE*, 1993) pp. 4/1–5.

Kamilo Feher, "MODEMS for Emerging Digital Cellular–Mobile Radio System", *IEEE Transactions on Vehicular Technology*, vol. 40, No. 2, pp. 355–365 (May 1991).

Gardner, "Demodulator Reference Recovery Techniques Suited for Digital Implemantation" (ESA Final Technical Report 1989, ESTEC Contract No. 6847/86/NL/DG) pp. 156–199.

*Primary Examiner*—Fan Tsang
*Assistant Examiner*—Congvan Tran
*Attorney, Agent, or Firm*—Burns, Doane, Swecker & Mathis, L.L.P.

[57] ABSTRACT

A method and apparatus for synchronizing and demodulating radio wave signals transmitted in frame format with an unique word, involving correcting the frequency offset of the received signal and differentially correlating the frequency corrected signal with the unique word, A first timing estimate is further refined by a 2-D search between frequency and time and a first frequency estimate is further refined by quadratic interpolation. The finely synchronized signal is demodulated using a Viterbi-based demodulator.

22 Claims, 6 Drawing Sheets

SYNCHRONIZATION TECHNIQUES AND SYSTEMS FOR RADIOCOMMUNICATION

BACKGROUND

The present invention relates to digital radio systems, and more specifically, to performing synchronization as part of the processing of a received signal in a radiocommunication system.

Radiocommunication systems involve the transmission of information over an air interface, for example by modulating a carrier frequency with that information. Upon reception, a receiver attempts to accurately extract the information from the received signal by performing an appropriate demodulation technique. However, in order to demodulate a received signal, it is first necessary to synchronize timing between the transmitter and the receiver. For example, clocking differences between the transmitter and the receiver provide for differences in bit timing. Moreover, in some radiocommunication systems, information is transmitted in bursts, sometimes referred to as "frames". In these types of systems it is also desirable to locate the beginning of a frame, so that information relevant to a particular receiver is isolated and demodulated.

Unfortunately, there exist many challenges associated with synchronizing to a received signal. For example, although the receiver may be tuned to an assigned frequency on which its intended signal has been transmitted, Doppler shifting may result in a large frequency offset between the frequency to which the receiver is tuned and the actual frequency of the desired information signal when it reaches the receiver after having travelled through the air interface. Moreover, the crystal oscillator used in the receiver is only accurate to within a certain number of parts per million, which may introduce an additional frequency offset.

In addition to an unknown frequency offset, a receiver must also cope with unknown phase accuracy, i.e., the receiver does not know the difference between the phase of the signal generated by its synthesizer at power-on and the phase of the received signal. Thus, the receiver faces at least three challenges in synchronizing to the received signal: unknown timing, unknown frequency offset and unknown phase.

Despite these challenges, performance objectives established for today's receivers are remarkably high. For example, most receiver designs require that synchronization almost always (e.g., 96% of the time) be acquired during the first frame in a burst. This performance objective is even more daunting in the arena of satellite communication systems, where Doppler effects can be relatively great, power constraints require acceptance of a relatively low signal-to-noise ratio and the frequency channels can be relatively narrow. This latter characteristic makes the frequency offset described above even more significant, since it then becomes entirely possible that a desired information signal has been frequency shifted to the center frequency of an adjacent channel.

Due to the importance of synchronization, and its impact on demodulation, the literature is replete with various discussions of these problems. For example, the impact of mobile-cellular standards on modulator-demodulator (MODEM) selection and design is addressed in an article by Kamilo Feher entitled "MODEMS for Emerging Digital Cellular-Mobile Radio System" (IEEE Transactions on Vehicular Technology, Vol. 40, No. 2, May 1991). This article discusses various modulation techniques that are used in emerging second generation radio systems. As this article points out, most system standards do not dictate the demodulation architecture. Manufacturing companies may use coherent, differential, or discriminator techniques for signal demodulation.

The above article focuses primarily on II/4-QPSK modulated signals. Feher claims that large frequency shifts render an offset-QPSK modulated signal unsuitable for low bit-rate communication systems. The present invention, however, overcomes this problem.

A particular demodulation technique is described in a report by Gardner entitled "Demodulator Reference Recovery Techniques Suited for Digital Implementation" (ESA Final Technical Report 1989, ESTEC Contract No. 6847/86/NL/DG). Gardner suggests using a maximum likelihood approach to estimate frequency error, and then a phase error detector to correct for phase.

Another demodulation technique is described in an article by J. Ahmad et al. entitled "DSP Implementation of a Preambleless All-Digital OQPSK Demodulator for Maritime and Mobile Data Communications" (IEEE, 1993, pp. 4/1–5). According to Ahmad, phase lock loops (PLLs), which are generally employed for coherent detection, have inadequate pull-in range for the initial carrier frequency. Ahmad suggests using a dual filter discriminator to estimate frequency offset, an AFC loop to correct frequency error, and a second order split loop for phase error detection.

However, among other drawbacks, neither of these schemes are considered by Applicants to achieve sufficiently accurate synchronization at a high enough first frame success rate in the face of low signal-to-noise ratios. Therefore, it would be advantageous to provide new techniques for synchronizing to a received information signal that overcomes these drawbacks.

SUMMARY

The present invention relates to synchronization of digital radio signals. Exemplary embodiments of the present invention involve, among other steps, coarsely correcting the frequency offset of a received signal and then differentially correlating the frequency corrected signal with the unique word. The differential correlation provides a correlation peak that provides a coarse estimate of timing. Because this approach to synchronization is data aided, it is fast and ensures a high probability of burst detection on the first transmitted frame.

Exemplary embodiments of the present invention include applying a 2-D search between frequency and time to determine whether there is a better correlation peak than that identified by the differential correlation described above. This second correlation peak provides a better estimate of sample and burst timing. Subsequently, quadratic interpolation refines the frequency estimate corresponding to this second correlation peak. These timing and frequency estimates are then used to synchronize the received signal. The synchronized signal is then demodulated using, for example, a Viterbi-algorithm-based demodulator.

BRIEF DESCRIPTION OF THE DRAWINGS

The present invention will now be described with reference to the accompanying drawings in which.

DETAILED DESCRIPTION

When the first frame of a desired information signal is received by a receiver, in most communication systems, the clock at the transmitter and the clock at the receiver are not "locked", i.e. they are not synchronized. It is also likely that there is frequency offset due to fading, shadowing, Doppler shift and other forms of random frequency modulation. Moreover, the relative phase of the received signal will not be known in systems where no phase reference is available. Thus, such a received signal effectively has unknown timing, unknown frequency and unknown phase.

Figure 1:
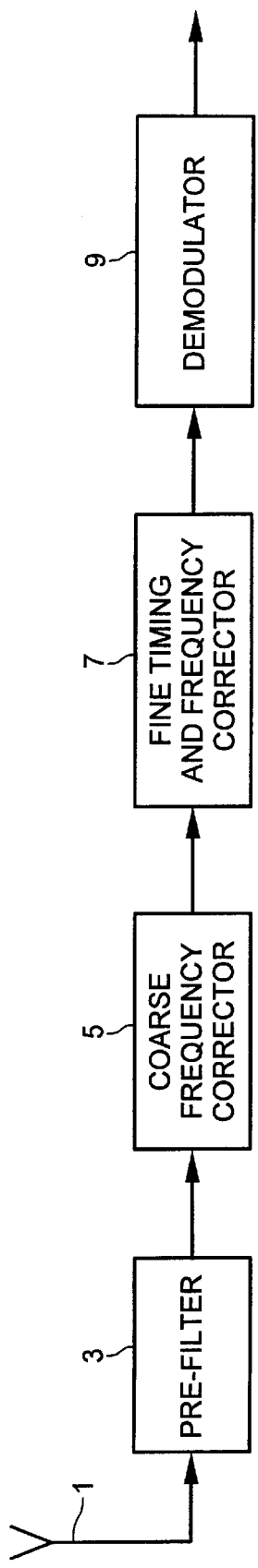
FIG. 1 illustrates a block diagram of a receiver according to an exemplary embodiment of the present invention.

As shown in FIG. 1, which is a high-level block diagram of a receiver according to an exemplary embodiment of the present invention, this received signal is input to a receiver via an antenna 1. The receiver filters the received signal using either an analog or a digital filter 3 which passes energy about the carrier frequency to which the receiver is tuned. This pre-filtering is done, inter alia, to remove noise introduced by the radio channel. Because it is not known in which direction and to what degree frequency offset has occurred, this pre-filter 3 should be relatively wide with respect to the channel's designed bandwidth to account for the largest expected frequency offset. For example, a 10 KHz filter could be used for a system employing 5 KHz-wide channels.

The pre-filtered signal is initially corrected for frequency offset in coarse frequency corrector 5. As will be described in more detail below, the course frequency corrector 5 rotates the pre-filtered signal according to a coarse frequency offset estimate to provide a coarsely (frequency) corrected signal. Although only a single block representation for a course frequency corrector 5 is illustrated in FIG. 1, those skilled in the art will appreciate that two or more coarse frequency correctors could be provided sequentially upstream of fine timing and frequency corrector 7 to perform iterative coarse correction until frequency offset has been corrected to a desired degree.

As will be described in more detail below with respect to FIG. 2, coarse correction of the signal for frequency offset can be performed in coarse frequency corrector 5 without using the unique (synchronization) word which is included in the received signal. In an exemplary embodiment of the present invention, the entire frame, i.e. all bits including the data bits and unique word bits, is corrected for frequency offset. The coarse frequency corrector 5 significantly reduces the overall time and power required to synchronize the received signal, particularly for cases where large frequency offsets occur.

Once the signal is coarsely corrected for frequency offset, the coarsely corrected signal can be filtered a second time using a narrower filter (not shown). Since the signal has been corrected for frequency offset, the second filter can be narrower than filter 3 without losing part of the message signal, thus excluding additional noise.

The fine timing and frequency corrector 7 then performs a differential correlation with the unique word over the entire coarsely corrected signal to generate a correlation peak, as will be described in more detail below with respect to FIG. 3. The correlation peak provides a coarse estimate of timing. Next, a 2-D search between frequency and time (i.e. applying a time shift and in turn applying a frequency rotation) can be used to determine whether there is a better correlation peak. The 2-D search results in a new set of correlation values. The correlation peak of this new set of correlation values is considered to provide the best burst and sample timing estimate.

The frequency estimate corresponding to the best timing estimate is refined by interpolation (smoothing). This interpolation finds a frequency "best fit." Once the best timing and best frequency estimates are obtained, the signal is finely synchronized and ready to be demodulated by a demodulator 9. The demodulator 9 can be any known demodulator, e.g., those which employ the Viterbi algorithm that tracks received data through a set of states and recovers the message signal accordingly. The 2-D search and quadratic interpolation can be repeated for better timing and frequency estimates.

Figure 2:
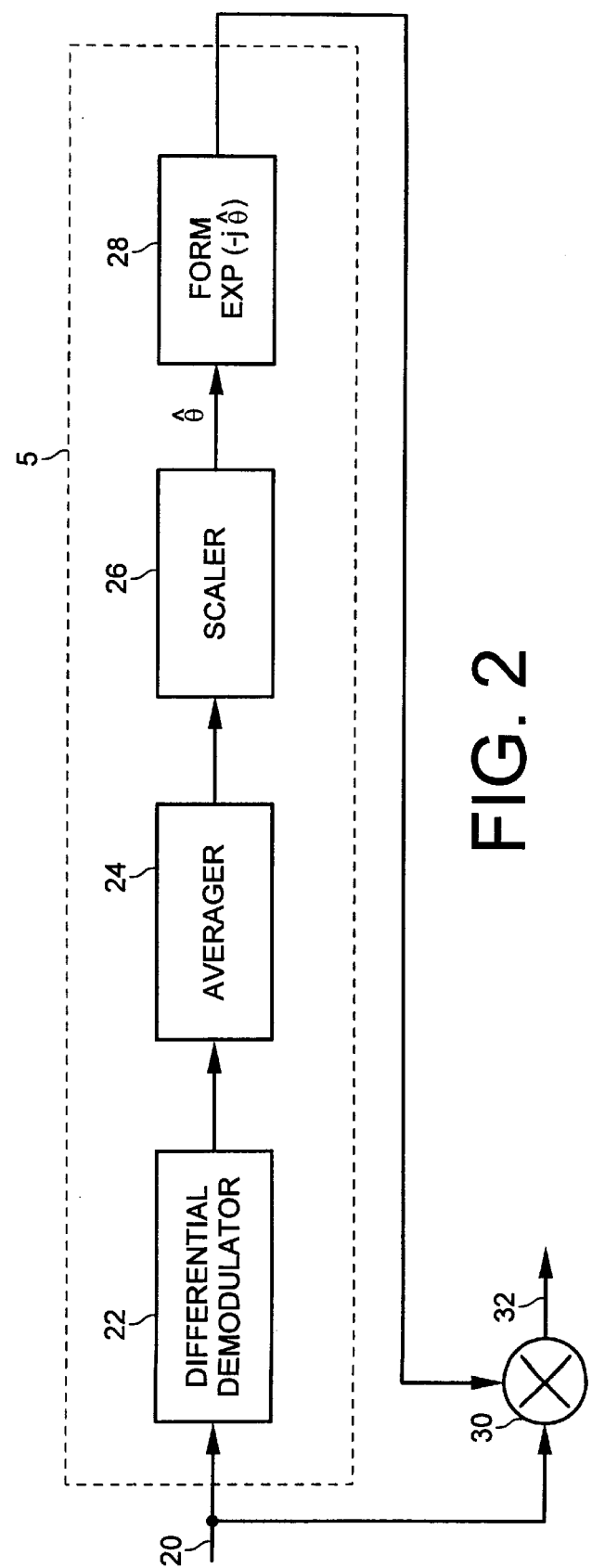
FIG. 2 shows an exemplary embodiment of the coarse frequency offset corrector of FIG. 1.

FIG. 2 illustrates a more detailed exemplary embodiment of the coarse frequency corrector 5 shown in FIG. 1. Therein, an input signal arriving on line 20 is sampled a predetermined number of times, e.g., four times per bit, to provide an input sample stream. Since each bit is sampled four times, it is possible to take the first sample from each bit to form a first set of samples, the second sample from each bit to form a second set of samples, and so on. The coarse frequency corrector 5 uses, in this exemplary embodiment, a differential detector 22 to differentially detect each set of samples to provide four sets of differential samples. Assuming that a received sample is represented as:

$$r_n = e^{j\Theta_n} S_n + n_n \quad (1)$$

where:

$e^{j\Theta}$ = the frequency offset at time n;

$S_n$ = the energy associated with the desired signal at time n; and $n_n$ = the energy associated with the noise at time n.

then the previously received sample, i.e., at time n−1 would be represented as:

$$r_{n-1} = e^{j\Theta_{n-1}} S_{n-1} + n_{n-1} \quad (2)$$

Differential detector 2 performs the operation $r_n r^*_{n-1}$, where the symbol "*" represents conjugation. Expanding this operation using equations (1) and (2) yields:

$$r_n r^*_{n-1} = S_n S^*_{n-1} e^{j(\Theta_n - \Theta_{n-1})} + S_n e^{j\Theta_n} n_{n-1} + S^*_{n-1} e^{-j\Theta_{n-1}} n_n + n_n n_{n-1} \quad (3)$$

The coarse frequency corrector 5 averages and scales the differential samples using an averager 24 and a scaler 26 to provide a coarse frequency offset estimate $\hat{\Theta}$. By taking a long-term average (i.e., expected value) of the output of differential detector 22, and assuming a Gaussian noise distribution, the last three terms in equation (3) will approach zero. Scaler 26 eliminates bias introduced by averager 24, as will be appreciated by those skilled in the art. At block 28, the conjugate of the coarse frequency offset estimate is formed to prepare the estimate for use in correcting the frequency offset at multiplier 30. That is, by multiplying the received samples with the conjugates of the coarse frequency offset estimates, the input sample stream is rotated back toward the correct (tuned) frequency. A coarsely corrected signal is then output on line 32 to either the fine timing and frequency corrector 7 or to another coarse frequency corrector 5, if another iteration of the above-described technique is desired to provide greater frequency accuracy before synchronizing to the received signal.

Although this exemplary embodiment of the present invention describes the coarse frequency estimator 5 as employing a differential demodulator (detector) 22 for providing phase difference information, those skilled in the art will appreciate that other devices could be employed to provide this differential phase information in unit 5. For example, two coherent correlators could be used to correlate the input symbol stream with the unique word at time n and time n−1 and take their phase differences. Using this alternative, however, it should be noted that the duration of the correlations should be sufficiently short that the frequency of the received signal does not change too much during the correlation process. The resultant phase differences would then be averaged, scaled and used to rotate the received signal as described above.

Figure 3:
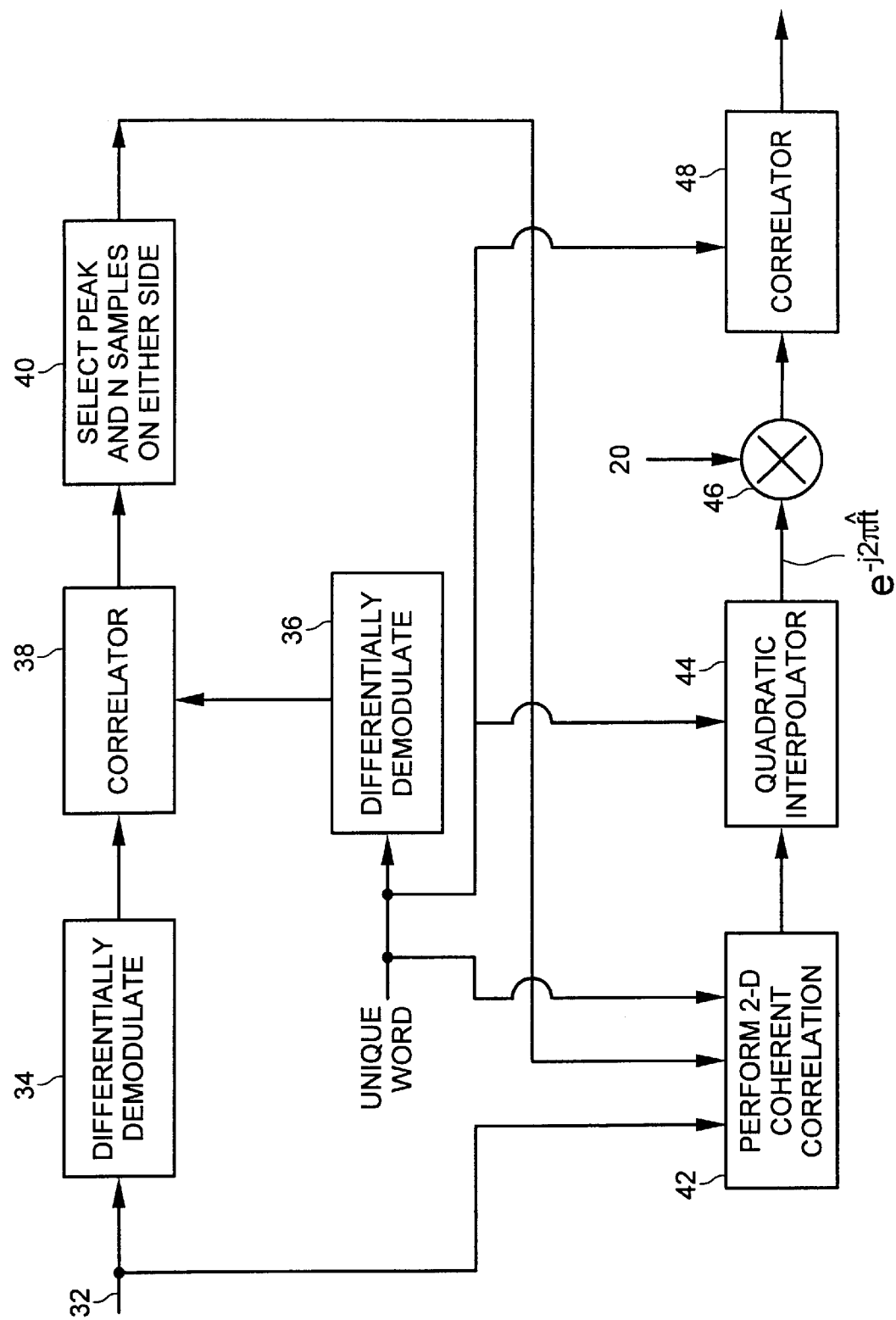
FIG. 3 shows an exemplary embodiment of the fine timing and frequency corrector of FIG. 1.

FIG. 3 illustrates an exemplary embodiment of the fine timing and frequency corrector 7 shown in FIG. 1. As an input, the fine timing and frequency corrector receives a coarsely corrected input stream, e.g., on line 32. This input stream is again differentially demodulated at block 34. By differentially demodulating the symbol stream at block 34, the effects of any remaining frequency rotation, i.e., which is uncorrected by coarse frequency corrector 5, are isolated to the differences between adjacent symbols.

Each burst of information includes a data field or word (sometimes also referred to as a sync word) which is unique to that burst or time slot. This unique word is known to the receiver and can be compared with the received signal as part of the synchronization process using correlation techniques. Since the input symbol stream is differentially demodulated at block 34, the known unique word is also differentially demodulated at block 36 to provide analogous inputs to correlator 38. The correlation can be found using, for example, two fast Fourier transforms (FFTs) and circular convolution. The correlator 38 outputs correlation values; one of which is a correlation peak. This correlation peak is a coarse estimate of timing. However, this peak may not be the "true" correlation peak due to, for example, some remaining frequency offset. Since the "true" correlation peak will at least be in the vicinity of the peak determined by correlator 38, a certain number N of additional samples to either side of the peak are also selected for further processing at block 40.

Then, the fine timing and frequency corrector 7 uses a best timing estimator 42 to perform a 2-D search between frequency and time (i.e. applying a time shift and in turn applying a frequency rotation) to determine whether there is a better correlation peak than that identified by correlator 38. The time parameters for the search are established by the selection of samples at block 40. Simulations can be used to provide an estimate of the maximum remaining frequency offset associated with the signal input to the fine timing and frequency corrector 7. For example, simulations may show that for a worst-case SNR the remaining frequency offset should not exceed ±200 KHz. This information is used to establish the frequency parameters for the search. The search can be conceptualized as follows. Suppose that two axes are established—one for time and one for frequency. Along the time axis, a number of divisions are established associated with the N+1 samples selected at block 40. Along the frequency axis, the maximum frequency offset error (e.g., ±200 KHz) is divided into some reasonable number of multiples (e.g., 40 multiples of 10 KHz each). More generally, this establishes N+1 time×M frequency "bins". Note that by coarsely correcting the frequency offset upstream of fine timing and frequency corrector 7, the number of "bins" used in the 2-D search engine 42 is reduced, which allows the present invention to synchronize to the received signal more rapidly and/or using fewer MIPS of processing power. Then, for each bin, i.e., for each combination of N+1 time shifts and M frequency offsets, the received input stream and the unique word are coherently correlated. A more detailed description of this type of 2-D search technique can be found in U.S. Pat. No. 5,151,926, the disclosure of which is expressly incorporated here by reference. The best timing estimator 42 thus provides a new set of correlation values. The correlation peak of this new set of correlation values provides the best burst and sample timing estimate.

The frequency estimate $f_0$ corresponding to this best timing estimate is further refined (smoothed) in quadratic interpolator 44. First, quadratic interpolator 44 chooses two frequencies, $f_1$ and $f_2$ such that $f_1$ is slightly less than $f_0$, and $f_2$ is slightly greater than $f_0$. The quadratic interpolator 44 performs a coherent correlation using $f_0$, $f_1$, and $f_2$ and short segments of the unique word. Using short segments of the unique word prevents one symbol from rotating into another symbol due to frequency changes during the correlation. The quadratic interpolator 44 adds magnitudes of the segments non-coherently to provide three new correlation values $y_0$, $y_1$, and $y_2$, respectively. The best timing estimate is then found using these values to evaluate equation (4), below. The quadratic interpolator next determines the maximum of the quadratic to determine the remaining frequency offset.

$$f_{best} = f_{max} = -b/(2a) \qquad (4)$$

$$a = \left[\frac{y_o - y_1}{x_o - x_1} - \frac{y_0 - y_2}{x_o - x_2}\right]\frac{1}{x_1 - x_2}$$

$$b = \frac{y_0 - y_2}{x_o - x_2} - a(x_o + x_2)$$

wherein $x_i = f_i$. Having obtained a fine estimate of any remaining frequency offset 7, the fine timing and frequency corrector 7 rotates the input data stream using a multiplier 46 to provide the finely synchronized signal. Lastly, the fine timing and frequency corrector 7 performs a final correlation at correlator 48 to locate the unique word and output the synchronized signal, e.g., to demodulator 9. The 2-D search and quadratic interpolation can be iterated with smaller frequency bins to obtain more accurate estimates.

Figure 4:
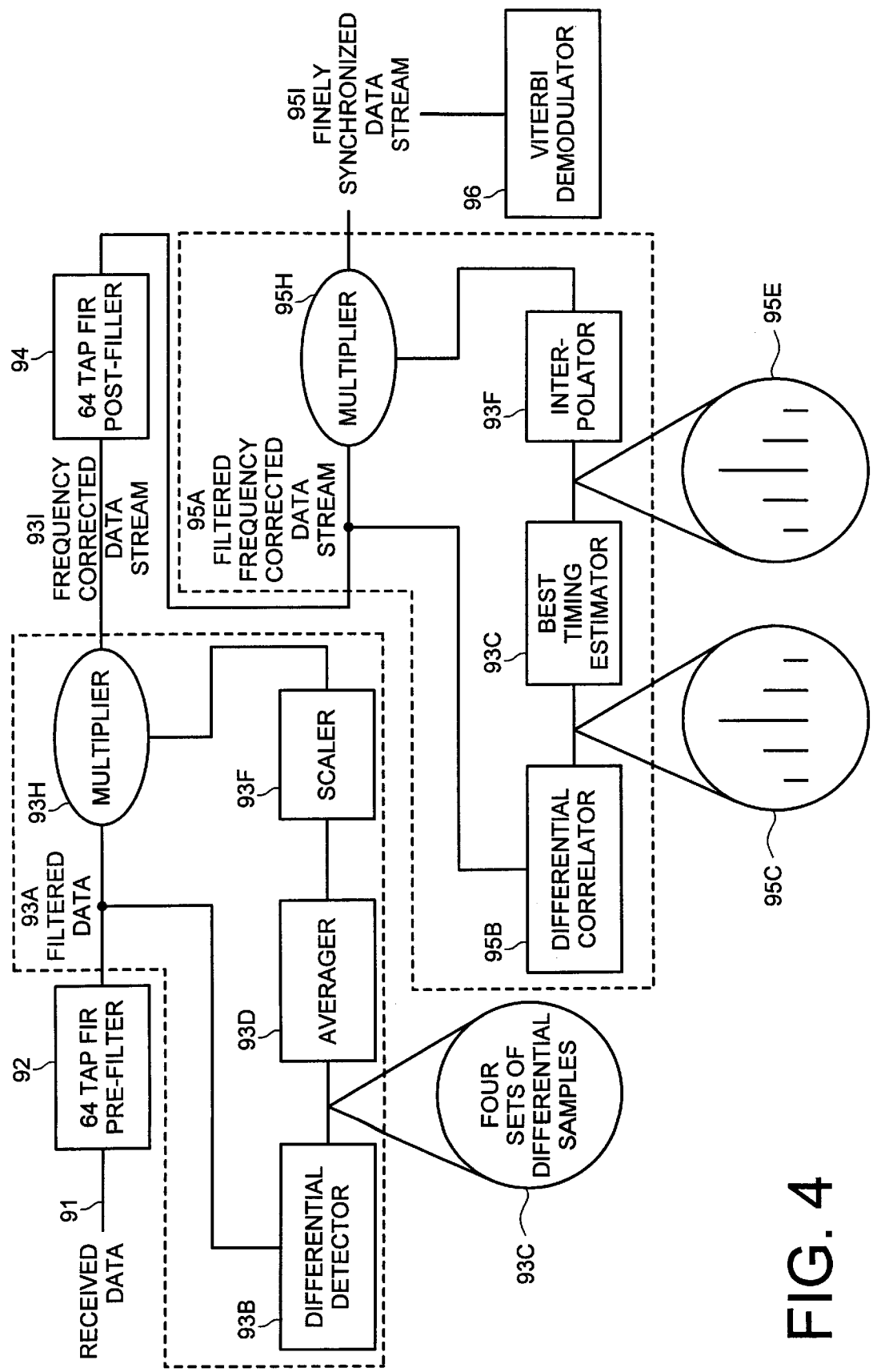
FIG. 4 shows a synchronizer and demodulator in accordance with an exemplary embodiment of the present invention useful for Inmarsat-M terminals.

FIG. 4 illustrates an exemplary embodiment of the present invention that is useful for Inmarsat-M or similar terminals. Some of the details of the afore-described techniques are omitted here for clarity. The received data 91 can be buffered, but is then filtered using a sixty-four tap finite impulse response (FIR) pre-filter 92 at four samples/bit. The filter 92 is transitional Gaussian up to −6 dB, i.e. it is approximately 6.84 kHz wide. The filtered data 93*a* is differentially detected by differential detector 93*b* (1 bit apart) for each sample point to provide four sets of differential samples. The differential samples 93*c* are averaged by an averager 93*d* and scaled by a scaler 93*f* to provide a coarse frequency offset estimate 93g. The filtered data 93a is rotated by a multiplier 93h to provide a frequency corrected data stream 93i. This frequency corrected data stream 93i is filtered using a sixty-four tap FIR post-filter 94. The filter 94 is 5 kHz wide and has a 3 dB bandwidth of 4.75 kHz. The filtered frequency corrected data stream 95a is differentially correlated using differential correlator 95b. The differential correlator 95b uses two 2048 point FFTs and circular convolution. The differential correlator 95b provides a set of correlation values and a correlation peak 95c. A best timing estimator 95d performs a 2-D search (a coherent correlation) over twenty-one frequency bins and nine sample points about the correlation peak 95c. The best peak 95e of the new set of correlation values gives the sample timing and the burst timing. The best three correlation values are taken from the 2-D search and quadratically interpolated by an interpolator 95f.

The filtered frequency corrected data stream 95a is rotated by the multiplier 95h to provide the finely synchronized data stream 95i. The finely synchronized data stream 95i is demodulated by a Viterbi demodulator 96 using thirty-two states. The Viterbi demodulator calculates branch metric values using the unique word to estimate the random phase error.

When the approach illustrated in FIG. 4 and described above was simulated with offset-QPSK modulation at a data rate of 5.7 kbps, with a signal-to-noise ratio (Eb/No) of 2 dB in an AWGN 5 kHz channel, a square root rolled cosine transmission filter with alpha=0.6, and a continuous frame transmission with each frame comprising ninety-six unique word bits followed by 576 data bits and twelve dummy bits, there was a 98% probability of frame acquisition within 120 ms. In addition the frequency error was estimated to within a standard deviation of +/−3 Hz.

Figure 5:
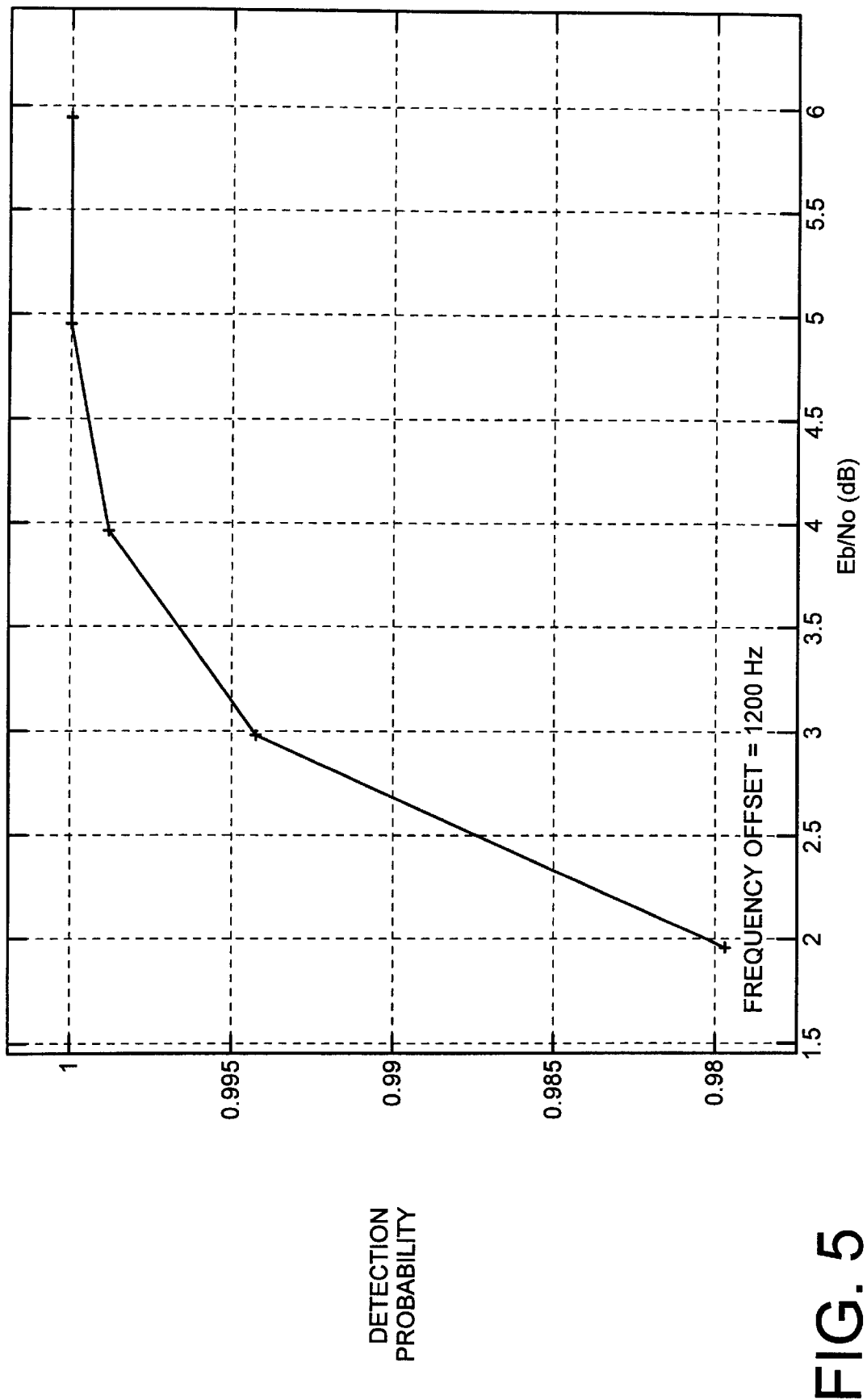
FIG. 5 is a graph illustrating peak detection probability versus signal-to-noise ratio for a simulation of an exemplary embodiment of the present invention.
Figure 6:
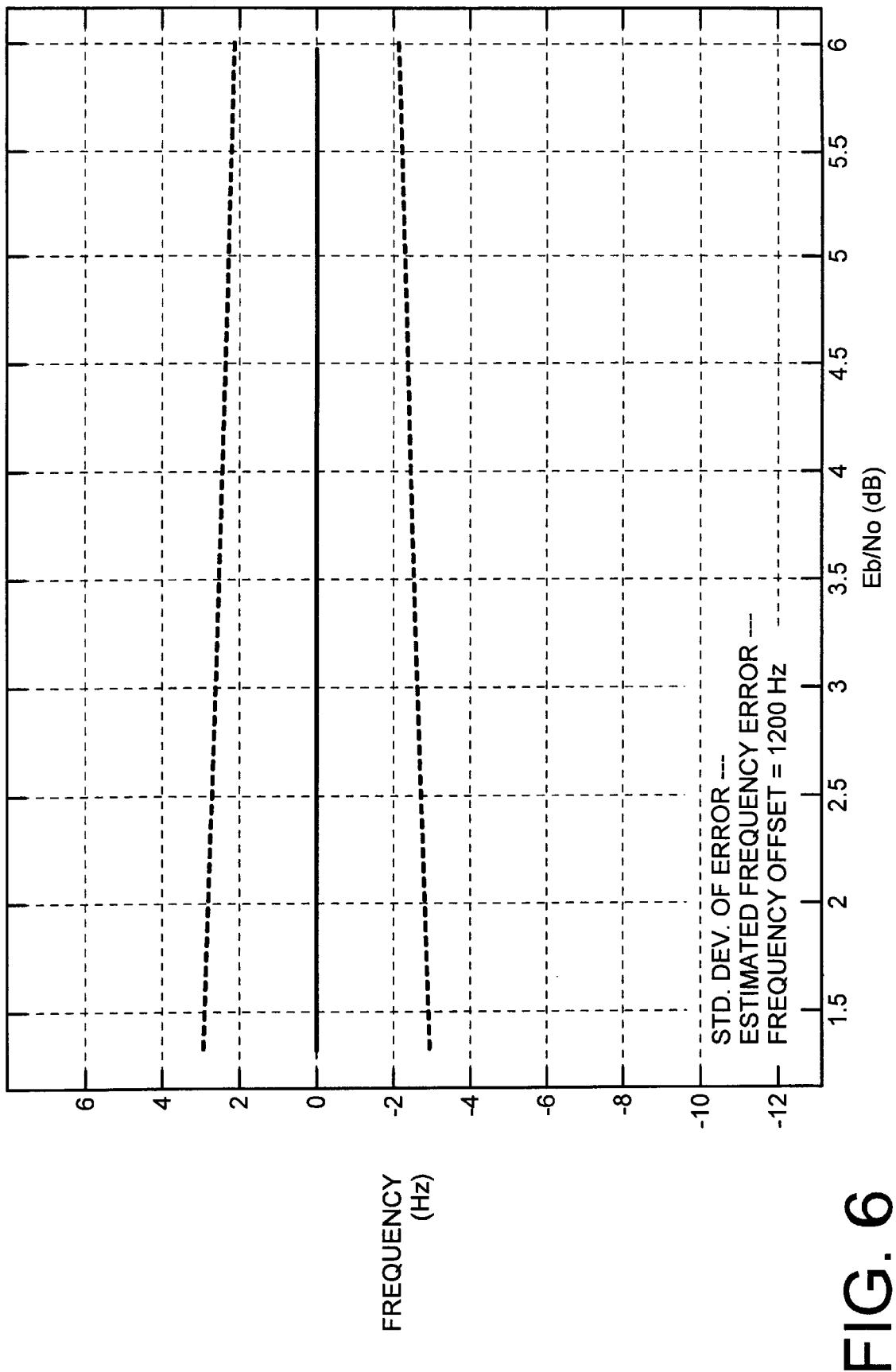
FIG. 6 is a graph illustrating estimated frequency error versus signal-to-noise ratio for a simulation of an exemplary embodiment of the present invention.

FIG. 5 is a graph illustrating the simulation results that shows the probability of detection of the frame to within +/−½ bit accuracy (1 bit accuracy) for a range of Eb/No values. The results indicate that at signal-to-noise ratio of 2 dB the exemplary embodiment of FIG. 4 provides frame acquisition to within bit accuracy with a probability of approximately 98%. That is, the inventive technique locates the start of the unique word within +/− bit about the true starting sample. Note that this probability of detection is conditional on the presence of a valid transmitted frame, in other words false alarm probability was not considered in this simulation. FIG. 6 illustrates the standard deviation of the residual frequency error for a range of Eb/No values. It is seen that the inventive technique provides frequency estimation with a standard deviation of +/−3 Hz accuracy at an Eb/No of 2 dB. This error corresponds to a phase rotation of approximately +/−0.2 degrees/bit.

Figure 7:
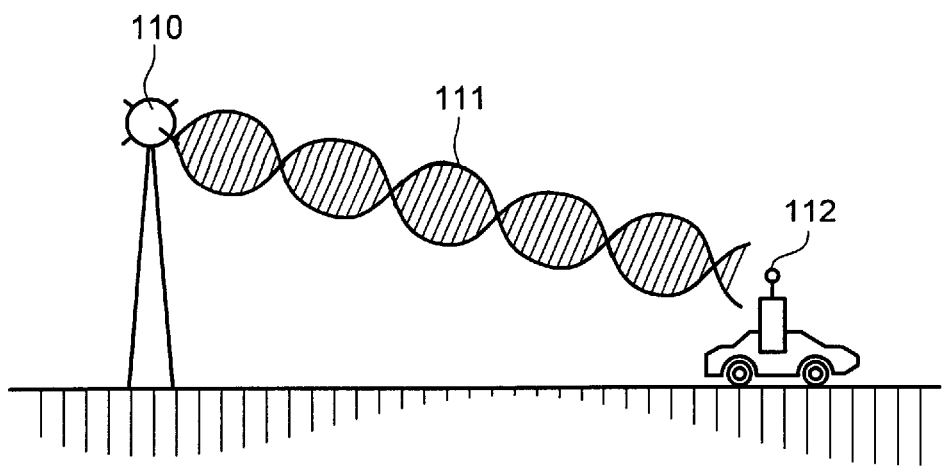
FIG. 7 is a representation of a land-based mobile cellular system.
Figure 8:
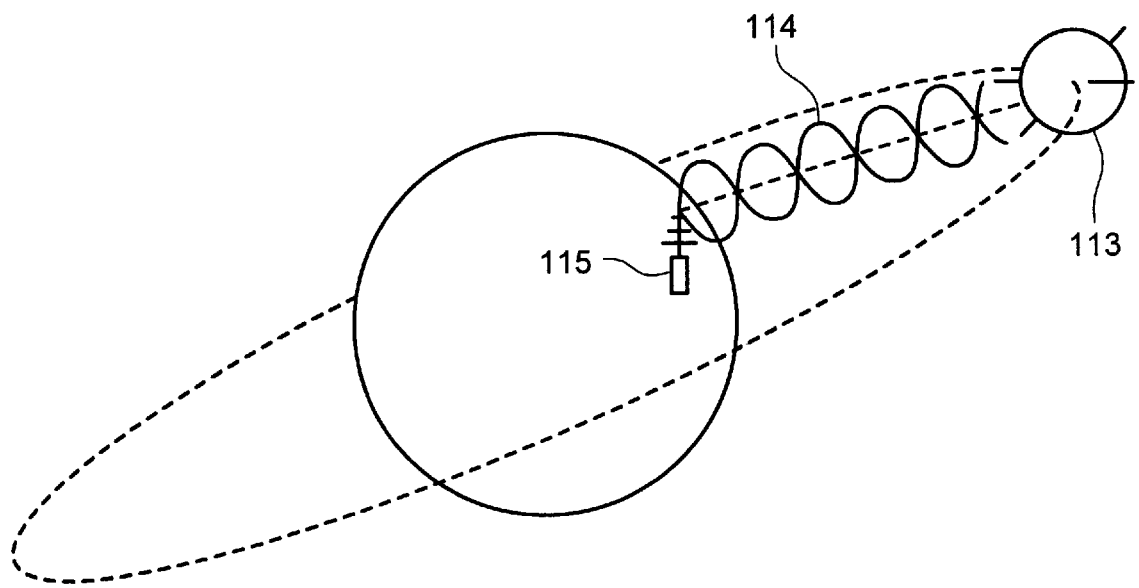
FIG. 8 is a representation of a satellite-based mobile cellular system.

FIG. 7 illustrates a general land-based mobile cellular system in which the afore-described techniques can be implemented wherein a receiver 112 is linked to another mobile or personal telephone user (not shown) by a land-based radio transmitter 110. The radio transmitted signal 111 is synchronized and demodulated in accordance with the present invention. FIG. 8 illustrates a general satellite-based mobile cellular system in which a receiver 115 is linked to another mobile or personal telephone user (not shown) by a satellite-based radio transmitter 113. The radio transmitted signal 114 is synchronized and demodulated in accordance with the present invention.

Advancements in very large-scale integration (VLSI) and digital signal processing (DSP) technology have made digital modulation more cost effective than analog transmission systems. Programmable digital signal processors have made it possible to implement digital modulators and demodulators completely in software. Accordingly, those skilled in the art will appreciate that hardware and/or software implementations of the present invention are within the scope of the present invention.

Multiple access schemes, e.g., frequency division multiple access (FDMA), time division multiple access (TDMA) and code division multiple access (CDMA), are used to allow many subscribers to simultaneously share a finite bandwidth within the radio spectrum. Exemplary embodiments of the present invention are independent of any particular multiple access scheme and, therefore, can be used in conjunction with these or other schemes.

The present invention is not limited to existing digital modulation schemes. It is useful for demodulating any radio transmitted signal that requires frequency estimation and sample and burst timing. The present invention has been described by way of exemplary embodiments to which the invention is not limited. Modifications and changes will occur to those skilled in the art without departing from the spirit and scope of the invention as defined in the appended claims.

What is claimed is:

1. A receiver comprising:
   a frequency estimator for determining a first estimate of frequency offset associated with a received signal;
   means for correcting said received signal using said first estimate to generate a corrected signal;
   a frequency and timing estimator which receives said corrected signal and determines a second estimate of frequency offset using a unique word known to said receiver and for outputting a timing estimate;
   means for further correcting said corrected signal using said second estimate to generate a frequency corrected signal; and
   means for synchronizing to said frequency corrected signal using said timing estimate.

2. The receiver of claim 1, wherein said first frequency estimator further comprises:
   a device for providing differential phase information between samples of said received signal;
   an averaging unit for averaging said differential phase information to generate an average value; and
   a scaling unit for scaling said average value to adjust for bias and to generate said first estimate.

3. The receiver of claim 1, wherein said means for correcting further comprises:
   a multiplier for multiplying a value related to said first estimate with said received signal.

4. The receiver of claim 1, wherein said frequency and timing estimator further comprises:
   a first differential demodulator for differentially demodulating said corrected signal;
   a second differential demodulator for differentially demodulating said unique word; and
   a correlator for providing a first set of correlation values between said differentially demodulated corrected signal and said differentially demodulated unique word, wherein a correlation peak associated with said correlation values provides an initial value of said timing estimate.

5. The receiver of claim 4, wherein said fine frequency and timing estimator further comprises:
   means for selecting said correlation peak and a predetermined number of samples surrounding said correlation peak;
   a two-dimensional coherent correlator which uses said selected number of samples and said correlation peak to correlating said unique word with a plurality of frequency offset and time-shifted versions of said received signal to generate a second set of correlation values; and an interpolator for smoothing a selected subset of said second set of correlation values to generate said second estimate.

6. The receiver of claim 1, wherein said means for further correcting further comprises:
   a multiplier for multiplying a value related to said second estimate with said received signal.

7. The receiver of claim 1, wherein said means for synchronizing further comprises:
   a correlator for correlating said unique word with said frequency corrected signal to identify a location of said unique word within said received signal.

8. The receiver of claim 2, wherein said device is a differential demodulator.

9. The receiver of claim 2, wherein said device includes at least one coherent correlator.

10. The receiver of claim 1, wherein said received signal is received using at least one of the following access methodologies: FDMA, TDMA and CDMA.

11. A receiver for receiving a signal including a frame of information, said frame including a unique word, said receiver comprising:
   a coarse estimator for coarsely estimating a frequency offset of said signal and correcting said signal using said estimated offset;
   a fine estimator for receiving said corrected signal, estimating a fine frequency offset using said unique word, correcting said corrected signal using said estimated fine frequency offset and identifying a location of said unique word within said frame; and
   a demodulator for demodulating said signal using said location.

12. A device for estimating a frequency offset associated with a received signal comprising:
   a first unit for providing differential phase information between samples of said received signal;
   an averaging unit for averaging said differential phase information to generate an average value;
   a scaling unit for scaling said average value to adjust for bias and to generate said frequency offset estimate; and
   a second unit for forming the conjugate of said frequency offset estimate.

13. The device of claim 12, wherein said first unit is a differential demodulator.

14. The device of claim 12, wherein said first unit includes at least one coherent correlator.

15. A device for estimating a frequency offset associated with a received signal and for estimating a location of a unique word within said received signal comprising:
   a first differential demodulator for differentially demodulating samples associated with said received signal;
   a second differential demodulator for differentially demodulating said unique word;
   a correlator for providing a first set of correlation values between said differentially demodulated received signal and said differentially demodulated unique word, wherein a correlation peak associated with said correlation values provides initial values of said frequency offset estimate and said timing estimate; and
   means for determining if said initial values of said frequency offset estimate and said timing estimate can be improved.

16. The device of claim 15 wherein said means for determining further comprises:
   means for selecting said correlation peak and a predetermined number of samples surrounding said correlation peak;
   a two-dimensional coherent correlator which uses said selected number of samples and said correlation peak to correlating said unique word with a plurality of frequency offset and time-shifted versions of said received signal to generate a second set of correlation values; and
   an interpolator for smoothing a selected subset of said second set of correlation values to generate said frequency offset estimate and timing estimate.

17. The device of claim 16, wherein said interpolator is a quadratic interpolator that operates according to the following equation:

$$f_{best} = f_{max} = -b/(2a)$$
$$a = \left[ \frac{y_o - y_1}{x_o - x_1} - \frac{y_o - y_2}{x_o - x_2} \right] \frac{1}{x_1 - x_2}$$
$$b = \frac{y_o - y_2}{x_o - x_2} - a(x_o + x_2)$$

wherein $y_0$, $y_1$ and $y_2$ are said selected subset of correlation values; and $x_0$, $x_1$ and $x_2$ are frequencies corresponding to $y_0$, $y_1$ and $y_2$, respectively.

18. A method of synchronizing to a data stream transmitted in frame format and having a unique word, comprising the steps of:
   adjusting the data stream to provide a frequency corrected data stream;
   correlating said frequency corrected data stream with a copy of said unique word to provide a plurality of correlation values;
   calculating a frequency estimate using at least one of said plurality of correlation values;
   correcting said data stream using said frequency estimate; and
   synchronizing to said corrected data stream.

19. A method according to claim 18, wherein said step of adjusting the data stream to provide a frequency corrected data stream further comprises the steps of:
   differentially demodulating samples of said data stream; and
   averaging and scaling said differential samples to generate a coarse frequency offset estimate; and
   rotating said data stream by said coarse frequency offset estimate.

20. A method according to claim 18, wherein said step of correlating further comprises the steps of:
   differentially demodulating said frequency corrected data stream and said unique word prior to performing said correlation.

21. A method according to claim 18, wherein said step of calculating further comprises:
   performing a 2-D search over a number of frequency bins and a number of sample points selected based upon said at least one of said plurality of correlation values to identify a set of correlation values, and
   performing a quadratic interpolation of said set of correlation values and a set of corresponding frequency estimates to identify said frequency estimate.

22. The receiver of claim 11, further comprising:
   a first filter upstream of said course estimator for filtering said signal; and
   a second filter for filtering said corrected signal prior to said corrected signal being input to said fine estimator, said second filter being narrower than said first filter.

* * * * *